(12) United States Patent
Chen et al.

(10) Patent No.: US 9,199,312 B2
(45) Date of Patent: Dec. 1, 2015

(54) CUTTING INSERT WITH DISCRETE CUTTING TIP AND CHIP CONTROL STRUCTURE

(75) Inventors: Shi Chen, North Huntingdon, PA (US); Kent Peter Mizgalski, Stahlstown, PA (US); Timothy William Halpin, Nuremberg (DE); John James Barry, Ennis (IE); Gerd Willi Heubeck, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 1265 days.

(21) Appl. No.: 13/041,506

(22) Filed: Mar. 7, 2011

(65) Prior Publication Data

US 2012/0230785 A1 Sep. 13, 2012

(51) Int. Cl.
    *B23B 27/16* (2006.01)
    *B23B 27/14* (2006.01)
    *B23B 27/22* (2006.01)

(52) U.S. Cl.
    CPC ....... *B23B 27/141* (2013.01); *B23B 2200/0447* (2013.01); *B23B 2200/081* (2013.01); *B23B 2226/125* (2013.01); *B23B 2226/315* (2013.01); *B23B 2240/08* (2013.01); *Y10T 407/23* (2015.01); *Y10T 407/235* (2015.01)

(58) Field of Classification Search
    CPC ................ B23B 27/145; B23B 27/141; B23C 2200/081
    USPC .................................................. 407/119, 113
    See application file for complete search history.

(56) References Cited

U.S. PATENT DOCUMENTS

| | | | |
|---|---|---|---|
| 4,702,649 A | 10/1987 | Komanduri | |
| 4,755,237 A | 7/1988 | Lemelson | |
| 4,854,784 A | 8/1989 | Murray et al. | |
| 5,026,960 A | 6/1991 | Slutz et al. | |
| 5,442,981 A * | 8/1995 | Vegh | 82/1.11 |
| 5,914,181 A * | 6/1999 | Uchino et al. | 428/216 |
| 5,979,571 A * | 11/1999 | Scott et al. | 175/61 |
| 6,106,585 A | 8/2000 | Packer et al. | |

(Continued)

FOREIGN PATENT DOCUMENTS

| | | |
|---|---|---|
| CN | 1382551 A | 12/2002 |
| CN | 1787892 A | 6/2006 |

(Continued)

OTHER PUBLICATIONS

Jun. 11, 2015 First office action.

*Primary Examiner* — Will Fridie, Jr.
(74) *Attorney, Agent, or Firm* — Larry R. Meenan

(57) ABSTRACT

A cutting insert incorporates a pre-formed discrete cutting tip which wraps around a curved cutting corner of the insert. The cutting tip includes a top layer and a bottom layer made of a relatively harder material than the top layer. In one embodiment, the bottom layer is made of polycrystalline diamond (PCD) or a polycrystalline cubic boron nitride (CBN) material and the top layer is made of cemented carbide. The cutting insert may further incorporate a chip control structure formed in the cutting tip including a plurality of facets formed on each side of a centerline for providing chip control during a cutting operation. The chip control structure can be formed in a two-step process to expose a portion of the bottom layer. The discrete cutting tip can be brazed to the cutting insert prior to forming the chip control structure.

17 Claims, 3 Drawing Sheets

(56) References Cited

U.S. PATENT DOCUMENTS

| | | | |
|---|---|---|---|
| 6,655,881 B2* | 12/2003 | Shimizu | 407/113 |
| 7,118,312 B2 | 10/2006 | Norstrom et al. | |
| 7,429,152 B2 | 9/2008 | Oles et al. | |
| 7,520,701 B2* | 4/2009 | Kukino | 407/119 |
| 7,524,148 B2* | 4/2009 | Okita et al. | 407/114 |
| 7,765,902 B2* | 8/2010 | Kuroda et al. | 82/1.11 |
| 2001/0037609 A1 | 11/2001 | Jensen et al. | |
| 2002/0007972 A1* | 1/2002 | Yong et al. | 175/374 |
| 2002/0131832 A1* | 9/2002 | Morsch | 407/118 |
| 2004/0052593 A1 | 3/2004 | Anderson | |
| 2005/0077092 A1* | 4/2005 | Yong et al. | 175/374 |
| 2008/0053711 A1* | 3/2008 | O'Neill | 175/432 |
| 2008/0138162 A1* | 6/2008 | Webb et al. | 407/113 |
| 2008/0226405 A1 | 9/2008 | Sjogren | |
| 2011/0163591 A1* | 7/2011 | Sleep et al. | 299/104 |
| 2011/0280673 A1* | 11/2011 | Degany | 407/42 |
| 2013/0168155 A1* | 7/2013 | Fang et al. | 175/374 |

FOREIGN PATENT DOCUMENTS

| | | |
|---|---|---|
| CN | 101080296 A | 11/2007 |
| EP | 1023961 A1 | 8/2000 |
| JP | 2004223648 A | 8/2004 |
| SE | 9301811 | 5/1993 |

* cited by examiner

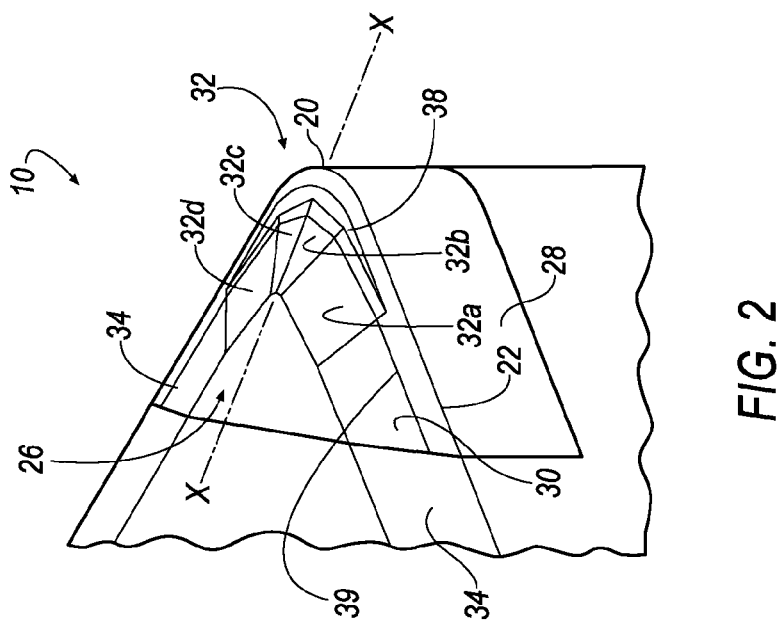
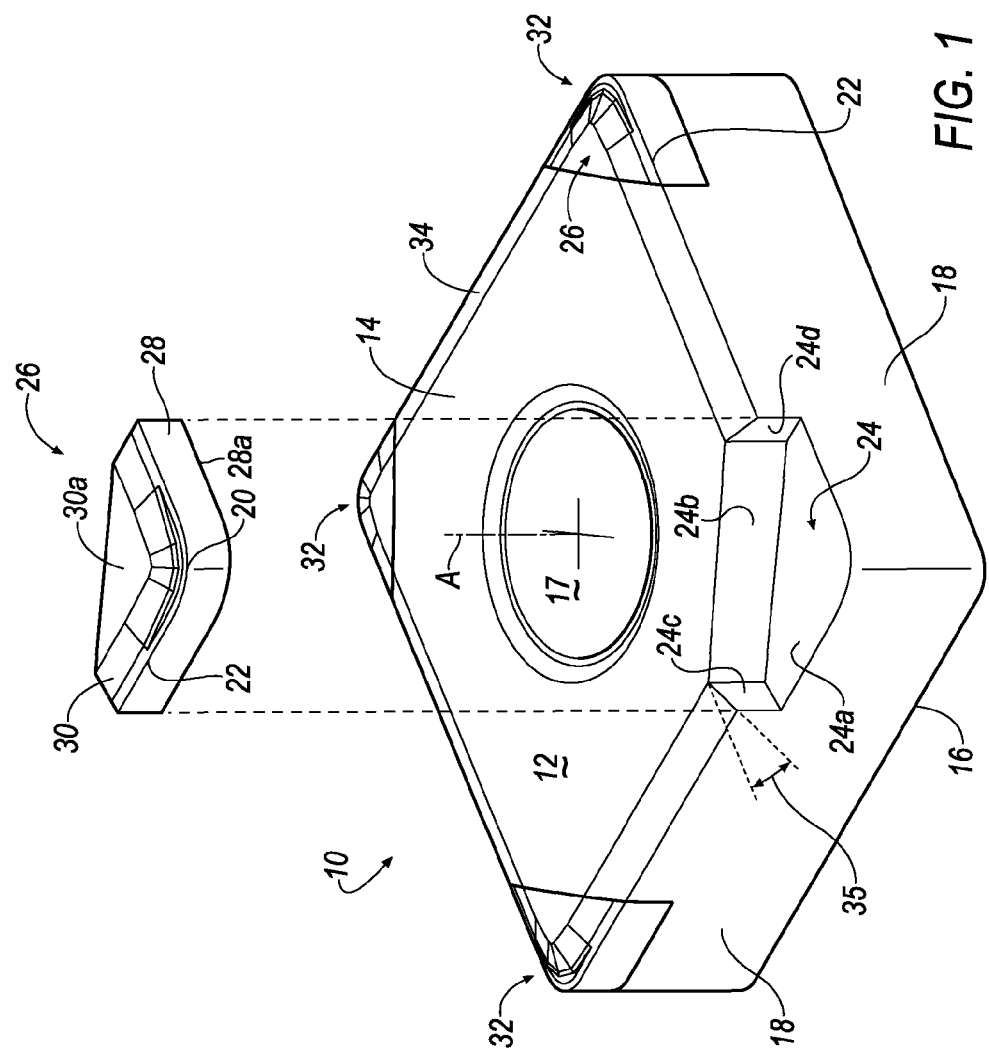
FIG. 1
FIG. 2

CUTTING INSERT WITH DISCRETE CUTTING TIP AND CHIP CONTROL STRUCTURE

BACKGROUND OF THE INVENTION

It is a continuing goal in the metal cutting industry to provide metal cutting inserts with sharp cutting edges that stay sharp longer even when machining non-ferrous and abrasive materials. To this end, it has been known to incorporate polycrystalline diamond (PCD) materials and polycrystalline cubic boron nitride (CBN) materials on a carbide substrate to provide an improved cutting edge. However, a significant portion of the cutting tip is embedded within the slot and this embedded portion acts only as structural material to retain the tip within the slot and does not contact the workpiece.

The cost of PCD or CBN materials used as a substrate is very high as compared to the cost of cemented carbide. One attempt to reduce cost is to provide a cutting insert that incorporates a discrete cutting tip that wraps around the nose of a cutting insert and having a top layer made of PCD or CBN material that is supported by a bottom layer of cemented carbide substrate. It has been found, however, that although the top layer of PCD or CBN material has sufficient thickness for allowing a chip breaker to be ground therein, the thickness of the top layer of PCD or CBN material is insufficient for machining operations, thereby reducing the machine life of the cutting insert.

SUMMARY OF THE INVENTION

The problem of reduced machine life of a cutting insert with a discrete tip made of a top layer of relatively harder material and a bottom layer of relatively softer material is solved by reversing these materials and providing a cutting insert with a discrete tip having a top layer made of a relatively softer material and a bottom layer made of a relatively harder material, and then removing material from the top layer to expose a portion of the relatively harder bottom layer to form the cutting edge.

In one aspect, a cutting insert comprises a body having upper face, a base face, at least two side walls joining the upper face and the lower face, a curved cutting corner at the intersection of the at least two side walls, and a cutting edge formed at the intersections of each side wall and the upper face; a recess formed in the curved cutting corner; and a cutting tip mounted in the recess, the cutting tip including of a top layer made of a first material, and a bottom layer disposed adjacent a floor of the recess and made of a second material having a greater hardness than the first material.

In another aspect, a method of fabricating a cutting insert having a cutting tip with a chip control structure defined by a plurality of facets, the cutting tip including of a top layer made of a first material, and a bottom layer disposed adjacent a floor of the recess and made of a second material having a greater hardness than the first material, the method comprising:
  removing material from the top layer at a first angle, A1, to expose the bottom layer; and
  removing material from the top layer at a second angle, A2, to further expose the bottom layer.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is an exploded an isometric view of a cutting insert in accordance with an aspect of the invention;

FIG. 2 is an enlarged, partial view of the cutting insert shown in FIG. 1 in accordance with an aspect of the invention;

DETAILED DESCRIPTION OF THE INVENTION

Figure 3:
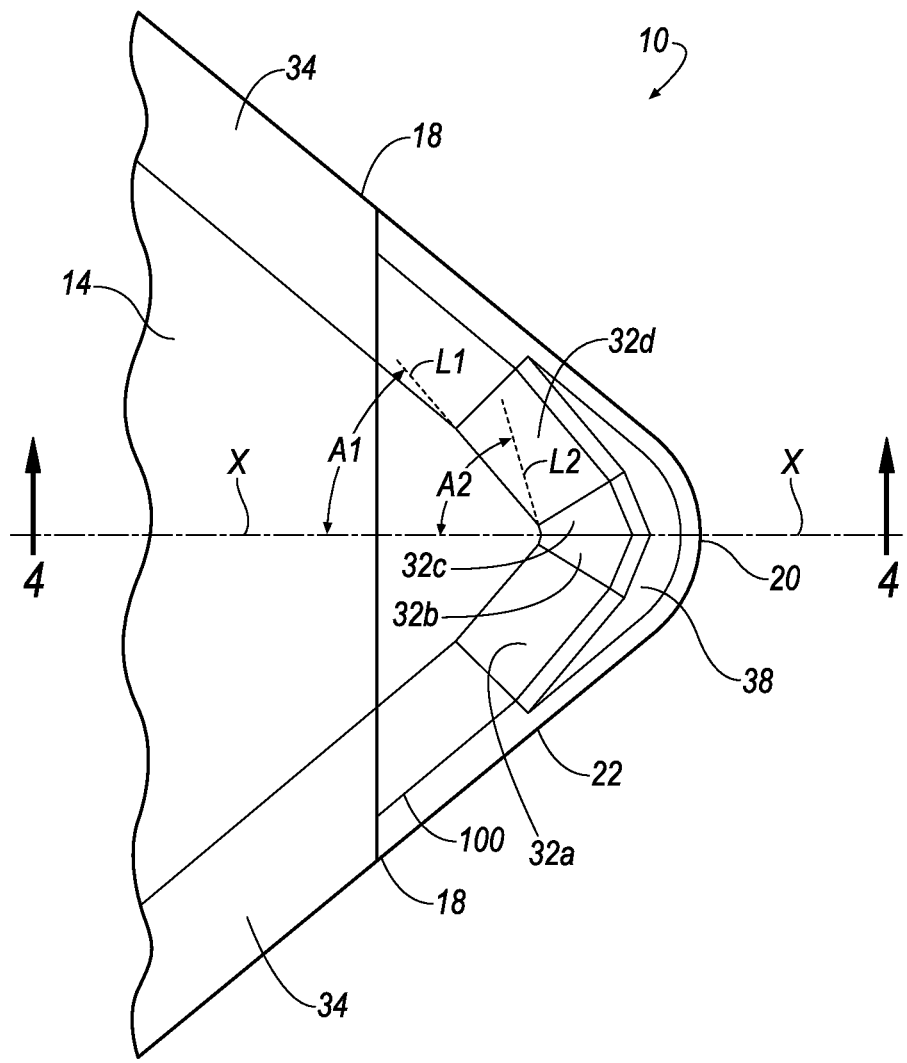
FIG. 3 is a top view of FIG. 2.

Referring now to FIGS. 1-4, a cutting insert is shown generally at 10 according to an embodiment of the invention. In general, the cutting insert 10 has a polygonal body 12 with a central axis A extending therethrough. The body 12 has an upper face 14, a substantially planar base face 16, and a plurality of side walls 18 perpendicular to and joining the faces 14 and 16. For the specific embodiment shown in the figures, a central pin receiving hole 17 is provided through the insert 10 for retention of the insert within a tool holder (not shown). In another embodiment, the cutting insert 10 does not include a hole therein for securing the cutting insert to a tool. Rather, the cutting insert 10 is retained in the tool by a clamping mechanism, which securely retains the cutting insert within the tool. Curved cutting corners 20 are respectively at the intersections of the side walls 18, while cutting edges 22 are respectively formed at the intersections of each side wall 18 and a T-land 34. In the event the cutting insert 10 does not have a T-land, the cutting edges 22 are formed at the intersection of each side wall 22 and a recessed land 38.

The body 12 may be made of a suitable material, such as cemented carbide, and the like, and may be fabricated by using any number of conventional processes known in the art, such as molding, and the like, such that a recess, shown generally at 24, is molded into the insert body 12. In the alternative, the recess 24 may be generated after the insert body 12 is fabricated by any number of commercial techniques for removing material from a cemented carbide substrate. The recess 24 is formed in each curved cutting corner 20 and extends between two adjacent side walls 18. As illustrated in FIG. 1, the recess 24 has a floor 24a, a back wall 24b, and end walls 24c, 24d.

One aspect of the invention is that the cutting insert 10 includes a pre-formed discrete cutting tip, shown generally at 26. The cutting tip 26 may be comprised of a bottom layer 28 made of a suitable material, such as polycrystalline diamond (PCD) or polycrystalline cubic boron nitride (PCBN) and a top layer 30 made of a suitable material, such as cemented carbide (line 39 is the separation line between the bottom layer 28 and the top layer 30). PCD is a common material used for non-ferrous applications, whereas PCBN is a common material used for hardened steel applications. It is known by those skilled in the art that PCD and PCBN has a greater hardness than cemented carbide. The bottom layer 28 defines a bottom surface 28a of the cutting tip 26 disposed adjacent the floor 24a of the recess 24, and the top layer 30 defines a top surface 30a of the cutting tip 26 (and also a portion of the top surface 14 of the cutting insert 10). The bottom surface 28a substantially corresponds in shape to the floor 24a of the recess 24 such that the cutting tip 26 mates with the recess 24.

The cutting tip 26 can be fabricated by using any number of conventional processes known in the art, such as molding, and the like. In one embodiment, the top layer 30 made of cemented carbide material is molded and the bottom layer 28 made of PCD or CBN material is deposited on the top layer 30, such as by vapor deposition, and the like. The tip 26 may be secured within the recess 24 of the cutting insert 10 by brazing, and the like. The cutting tip 26 forms a portion of the curved cutting corner 20 when secured within the recess 24.

In another aspect of the invention, the cutting insert 10 includes a chip control structure, shown generally at 32, formed in the upper face 14 and extends continuously along the cutting edges 22. In one aspect of the invention, the chip control structure is formed at least substantially in or on the cutting tip 26. In the illustrated embodiment, the cutting insert 10 is symmetrical about a centerline or bisector line X-X of the curved cutting corners 20 of the cutting insert 10. In one embodiment, the chip control structure 32 includes a plurality of facets 32a, 32b, 32c and 32d that are formed on opposing sides of a centerline X-X of the curved cutting corners 20 of the cutting insert 10. More specifically, the facets 32a and 32b are formed on one side of the centerline X-X, while facets 32c and 32d are formed on the opposite side of the centerline A-A. Alternatively, the chip control structure 32 may be formed as a continuously curved surface, rather than the faceted surface of the illustrated embodiment.

Figure 4:
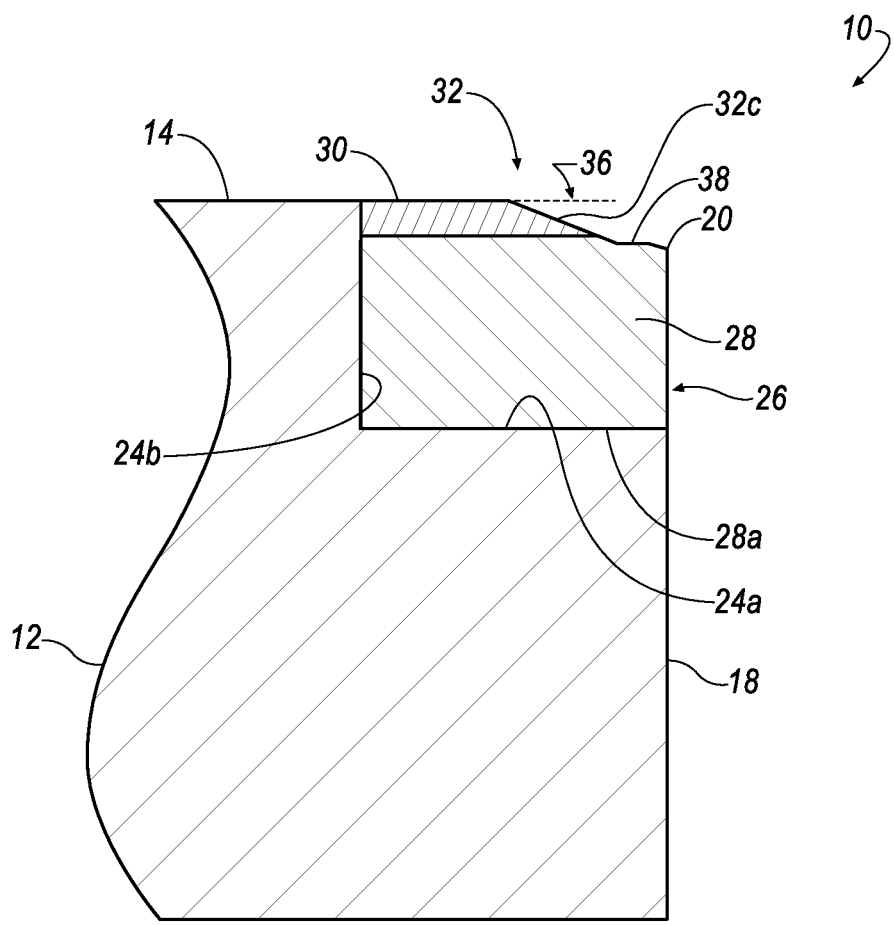
FIG. 4 is a cross-sectional view taken along line 4-4 of FIG. 3.

Although the form of the facets 32a, 32b, 32c and 32d may be any of a variety of forms known in the art to promote the formation of chips, FIG. 4 illustrates an embodiment in which the facets 32a, 32b, 32c and 32d are formed at a facet angle 36 with respect to the top surface 14 of the insert body 12. In particular, the facet angle 36 may have a range between about five (5) degrees and about forty-five (45) degrees. In the illustrated embodiment, the facets 32a, 32b, 32c and 32d are formed in a T-land 34 that extends at an angle 35 between the upper face 14 and the side wall 18. In one embodiment, the angle 35 may be in a range between about five (5) degrees and about forty-five (45) degrees. For example, the angle 35 may be about twenty-five (25) degrees. The facets 32a, 32b, 32c and 32d terminate in the recessed land 38 formed by exposing the bottom layer 28 during a two-step process explained below.

As shown in FIG. 3, a line, L1, extends along the intersection between the facets 32a, 32d and the top surface 14 of the cutting insert 10. Similarly, a line, L2, extends along the intersection between the facets 32b, 32c and the top surface 14 of the cutting insert 10. A angle, A1, is defined between the centerline X-X and the line, L1, and a angle, A2, is defined between the centerline X-X and the line, L2. As seen in FIG. 4, the angle, A2, is greater than the angle, A1. However, both angles, A1 and A2, are less than ninety degrees. For example, angle, A1, may be about five (5) degrees, and angle, A2, may be about twenty-two (22) degrees.

In another aspect of the invention, the facets 32a, 32b, 32c, 32d may begin below the upper face 14 and slope downwardly toward a recessed land 38 in which the bottom layer 28 made of PCD or CBN material is exposed to form the cutting edge 22. It will be appreciated, that additional facets, i.e. more than the illustrated two facets on each side of the centerline X-X of the curved cutting corner 20 may be provided in accordance with aspects of the invention. Additionally, while a single cutting tip 26 has been discussed with respect to a single curved cutting corner 20, it should be appreciated that other cutting tips 26 may be associated with the other curved cutting corners 20, respectively, as shown in FIG. 1.

In addition, a C-shaped cutting insert 10 is shown in FIGS. 1-4. However, it will be appreciated that the invention is not limited by a particular shape of the cutting insert. For example, the principles of the invention can be practiced with a D-shaped cutting insert, a V-shaped cutting insert, and the like. Further, the cutting insert 10 of the invention should not be limited by a cutting insert having four side walls. For example, the cutting insert of the invention can have a triangular shape with three side walls, a pentagonal shape with five side walls, a hexagonal shape with six side walls, an octagon with eight side walls, and the like.

FIGS. 1-4 illustrate the facets 32a, 32b, 32c and 32d are formed at an angle 36 with respect to the top surface 14 of the cutting insert 10. In the illustrated embodiment, the facets 32a and 32d are formed at the same angle 36, while the facets 32b and 32c are formed at a different angle 36 than the facets 32a and 32d. However, it will be appreciated that the invention is not limited by the angle 36 of the facets 32a, 32b, 32c and 32d, and that the invention can be practiced with the facets 32a, 32b, 32c and 32d formed at the same angle 36. For example, the facets 32a, 32b, 32c and 32d can have an undulating profile such that the angle 36 defined in FIG. 4, varies along the recess 24. In this embodiment, the angle 36 may have a value ranging between about 5 degrees to about 45 degrees. Other angles known to those skilled in the art are within the scope of the invention.

What has so far been described are cutting inserts having two sides which converge to define the radiused or curved cutting corners 20. However, it is entirely possible for the two sides to be parallel and act as a bridge between these two sides, thereby providing a recess to accept the cutting tip 26.

A method of fabricating the cutting insert 10 of the invention will now be described. First, a molding process is performed to form the polygonal body 12 made of cemented carbide with the recesses 24 at each curved cutting corner 20 of the cutting insert 10 in the mold. Each recess 24 has a depth that may be, for example, less than one half of the distance of a straight line connecting the end walls 24c, 24d of the recess 24. Alternatively, the polygonal body 12 may be molded, and then material can be removed in a separate step to form the recess 24.

Next, the discrete cutting tip 26 is formed by molding the cemented carbide top layer 30, and then depositing the PCD or CBN material onto the top layer 30. Then, the cutting tip 26 is positioned within the recess 24. Next, the cutting tip 26 is secured within the recess 24 by brazing, and the like.

In accordance with an aspect of the invention, the facets 32a, 32b, 32c and 32d of the chip control structure 32 are formed in the cutting insert 10 by a two-step process. In the first step, the facets 32a and 32d are formed by removing material from the top layer 30 of cemented carbide material at the angle, A1, with respect to the the centerline, X-X, to form the facets 32a and 32d at the angle 36. The material can be removed by any suitable means, such as grinding, laser, and the like. During the forming of the facets 32a and 32d, a portion of the top layer 30 is removed in such a way that a portion of the bottom layer 28 of PCD or CBN material is exposed to form a first portion of the cutting edge 22. In the second step, the facets 32b and 32c are formed by removing material from the top layer 30 of cemented carbide material at the angle, A2, with respect to the centerline, X-X, to form the facets 32b and 32c at the angle 36, which may or may not be different than the angle 36 of the facets 32a and 32d. During the forming of the facets 32b and 32c, a portion of the top layer 30 is removed in such a way that a second portion of the recessed land 38 is exposed to form a second portion of the cutting edge 22.

Throughout this discussion, inserts having a variety of shapes and configurations for holding such inserts have been presented. It should be appreciated any shape of insert may be secured within a toolholder, using any of a number of different configurations, whether it be a hold down screw extending into a bore through the insert body and threaded into the toolholder pocket, or a clamp holding the insert within the pocket of a toolholder. Therefore, the manner of holding inserts, and the modifications to an insert body necessary for holding such inserts discussed herein should not be interpreted as a limitation upon the scope of the invention.

The patents and publications referred to herein are hereby incorporated by reference.

Having described presently preferred embodiments the invention may be otherwise embodied within the scope of the appended claims.

What is claimed is:

1. A cutting insert, comprising:
   a body having upper face, a base face, at least two side walls joining the upper face and the lower face, a curved cutting corner at the intersection of the at least two side walls, and a cutting edge formed at the intersections of each side wall and the upper face;
   a recess formed in the curved cutting corner; and
   a cutting tip mounted in the recess, the cutting tip including of a top layer made of a first material, and a bottom layer disposed adjacent a floor of the recess and made of a second material having a greater hardness than the first material.

2. The cutting insert of claim 1, wherein the bottom layer is made of polycrystalline diamond or polycrystalline cubic boron nitride, and wherein the top layer is made of cemented carbide.

3. The cutting insert of claim 1, wherein the cutting tip includes a chip control structure formed by removing material from the top layer to expose the bottom layer.

4. The cutting insert of claim 3, wherein the chip control structure includes a plurality of facets.

5. The cutting insert of claim 4, wherein at least two facets are formed on each side of a centerline extending through the curved cutting corner.

6. The cutting insert of claim 5, wherein the facets are formed at an angle relative to the top surface of the body.

7. The cutting insert of claim 6, wherein the angle is between about 5 degrees and about 45 degrees.

8. The cutting insert of claim 5, wherein the facets are formed in a T-land extending between the upper face and the at least two side walls.

9. The cutting insert of claim 5, wherein the facets terminate in a recessed land.

10. The cutting insert of claim 1, wherein the recess has a floor, a back wall, and end walls.

11. The cutting insert of claim 10, wherein the bottom layer of the cutting tip defines a bottom surface, and the top layer of the cutting tip defines a top surface, and wherein the bottom surface of the cutting tip substantially corresponds in shape to the floor of the recess such that the cutting tip mates with the recess.

12. The cutting insert of claim 1, wherein the body is made of cemented carbide material.

13. A method of fabricating a cutting insert having a cutting tip with a chip control structure defined by a plurality of facets, the cutting tip including of a top layer made of a first material, and a bottom layer made of a second material having a greater hardness than the first material, the method comprising:
   removing material from the top layer at a first angle, $A_1$, to expose the bottom layer; and
   removing material from the top layer at a second angle, $A_2$, to further expose the bottom layer.

14. The method of claim 13, further comprising the step of forming a body of the cutting insert by molding the body and including a recess within a mold.

15. The method of claim 14, further comprising the step of brazing the cutting tip within the recess of the cutting insert.

16. The method of claim 13, further comprising the step of forming a body of the cutting insert by molding the body and then removing material from the body to form a recess.

17. The method of claim 16, further comprising the step of brazing the cutting tip within the recess of the cutting insert.

* * * * *